(12) United States Patent
Hansen

(10) Patent No.: US 7,072,057 B1
(45) Date of Patent: Jul. 4, 2006

(54) SYSTEM AND METHOD FOR INTERFACING WITH A PRODUCTION SCANNER

(75) Inventor: David R. Hansen, Honeoye Falls, NY (US)

(73) Assignee: NexPress Digital LLC, Rochester, NY (US)

( * ) Notice: Subject to any disclaimer, the term of this patent is extended or adjusted under 35 U.S.C. 154(b) by 1348 days.

(21) Appl. No.: 09/686,850

(22) Filed: Oct. 10, 2000

(51) Int. Cl.
*G06K 1/00* (2006.01)
*H04N 1/32* (2006.01)
*G06F 3/00* (2006.01)

(52) U.S. Cl. .................. 358/1.15; 358/1.13; 358/442; 719/328

(58) Field of Classification Search ............... 358/1.13, 358/1.15, 442; 719/328
See application file for complete search history.

(56) References Cited

U.S. PATENT DOCUMENTS 5,764,866 A * 6/1998 Maniwa .................. 358/1.15
6,163,816 A * 12/2000 Anderson et al. ............... 710/8
6,286,054 B1 * 9/2001 Wang ........................ 719/321

* cited by examiner

*Primary Examiner*—Edward Coles
*Assistant Examiner*—Houshang Safaipour

(57) ABSTRACT

A system and method for interfacing with production scanners is disclosed. A driver is provided which enables real-time communications between a scanning application and scanner devices. The driver includes an application program interface which is coupled with one or more personality modules, one for each scanner device. The personality module facilitates the command and control of a particular scanner device. The application program interface can communicate with more than one personality module at any given time to enable parallel simultaneous operation of multiple scanner devices. The driver delivers resultant image data from the scans to a commonly accessible buffer where the scanning application can asynchronously retrieve it.

29 Claims, 5 Drawing Sheets

Microfiche Appendix Included
(8 Microfiche, 690 Pages)

SYSTEM AND METHOD FOR INTERFACING WITH A PRODUCTION SCANNER

RELATED APPLICATIONS

The following co-pending and commonly assigned U.S. Patent Application has been filed on the same date as the present application. This application relates to and further describes other aspects of the embodiments disclosed in the present application and is herein incorporated by reference.

U.S. patent application Ser. No. 09/686,995, "SYSTEM AND METHOD FOR INTERFACING WITH MULTIPLE PRODUCTION SCANNERS", filed concurrently herewith.

REFERENCE TO MICROFICHE APPENDIX

A microfiche appendix is included of Appendices C, D and E. The total number of microfiche is 8. The total number of frames is 690.

REFERENCE TO APPENDICES

Appendices A and B are included and are printed immediately preceding the claims. In addition, Appendices C, D and E, are also included as a microfiche appendix.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

While just about every computer user owns their own printer and is capable of producing high quality documents, the ability to produce such documents in high volume and with special finishing features, such as binding, is still within the purview of the commercial print shops and corporate copy departments. High volume, finished production of documents is typically referred to as production printing. A production printer is a printing device capable of rapid production of large volumes of documents. Typically these printers have high paper handling capacity, the ability to draw on multiple media types from multiple sources and the ability to automatically finish a document such as by adding a binding. Despite the automation provided by the production printer and the proliferation of computer technology, especially in the area of desktop publishing, production printing is still a complicated and often manual process.

In a typical print shop, customers bring in original documents which they want turned into a finished product such as a bound booklet, a tri-fold brochure or a tabbed three ring bound notebook. In addition, they typically need a large volume of the finished product, for example, one thousand brochures. The combination of the original documents plus the instructions for producing the finished product is called a "job". The documents can be brought in either in hard copy or electronic form, such as on floppy disk, compact disc or tape or can be transmitted to the print shop over a network such as the Internet.

Documents which are delivered in a hard copy form to the print ship must first be scanned into the shop's computer system so that they can be edited and otherwise prepared for production. Typically, the shop will have a one or more scanning stations consisting of one or more workstation computers coupled with one or more production scanners. As compared to consumer grade scanner devices, production scanners are high volume devices which are capable of scanning a high volume of originals continuously at high speed and at high resolution. While scanners tend to be very accurate and reliable devices, scanning documents can still be very resource intensive especially coupled with the high volume and high speed environment of a production print shop.

In a typical operation, the operator will load a document into the scanner's automated feeder. Next, the operator will load the scanning application into the workstation, if not already loaded, and then instruct the scanner to scan the document. Once the scan is complete, the operator can view the scanned document and verify that a faithful reproduction was made. Often, however, errors occur during the scanning process which may require rescanning. Such errors include operator errors or scanner malfunctions such as dust on the scanning glass, paper mis-feeds or lamp failures. Further, sometimes the parameters of the scan, such as the image processing algorithms, contrast or color balance, need to be adjusted to account for the characteristics of the original document. These adjustments may not be apparent from a visual examination of the original document and may require several re-scans to get the parameters set correctly. For large documents, such rescanning can be time consuming and costly.

The combination of large documents, the print shop's large workload and the inevitable errors that occur requires that the scanning process be as efficient as possible. This typically translates into reducing operator errors and reducing the cost of error recovery and correction. One solution is to provide intelligent and efficient scanning applications for the operator to use on the scanning workstation which anticipate problems and offer intuitive and efficient control of the scanning operations. Unfortunately, such applications are often limited by the hardware and software interfaces to the scanners which fail to provide the necessary control over scanner operation and scanner feedback of status and event data for error detection and correction. Further, these interfaces lack the ability to allow efficient management and operation of multiple scanners or scanners which are located remotely from the scanning workstation, such as in a clean room environment.

Accordingly, there is a need for an efficient system and method for interfacing scanning applications with high volume production scanners.

SUMMARY

The present invention is defined by the following claims, and nothing in this section should be taken as a limitation on those claims. By way of introduction, the preferred embodiments described below relate to a driver for interfacing a first application program to a first scanner. The first application program is operative to transmit commands to the first scanner and the first scanner operative to scan a document and transmit image data and status data from the scan to the first application program. The driver comprises an application program interface ("API") coupled with the first application program and operative to receive the commands from the first application program and provide the image data and the status data to the first application program. The driver further comprises a first scanner personality module ("SPM") coupled with the API and the first scanner and operative to receive the image data and the status data from the first scanner and transmit the commands to the first scanner. Wherein the API and the first SPM facilitate real time communication between the first application program and the first scanner.

The preferred embodiments further relate to a method of interfacing a first application program to a first scanner, the first application program executing on a first computer coupled with the first scanner. The method comprises: initiating a first scan of a first document on the first scanner as directed by the first application program; receiving first image data generated by the first scan as the first scan progresses; receiving first status data from the first scanner as the first scan progresses; providing the first image data and the first status data to the first application program as the first scan progresses; and adjusting the first scan as the first scan progresses.

DETAILED DESCRIPTION OF THE PRESENTLY PREFERRED EMBODIMENTS

Figure 1A:
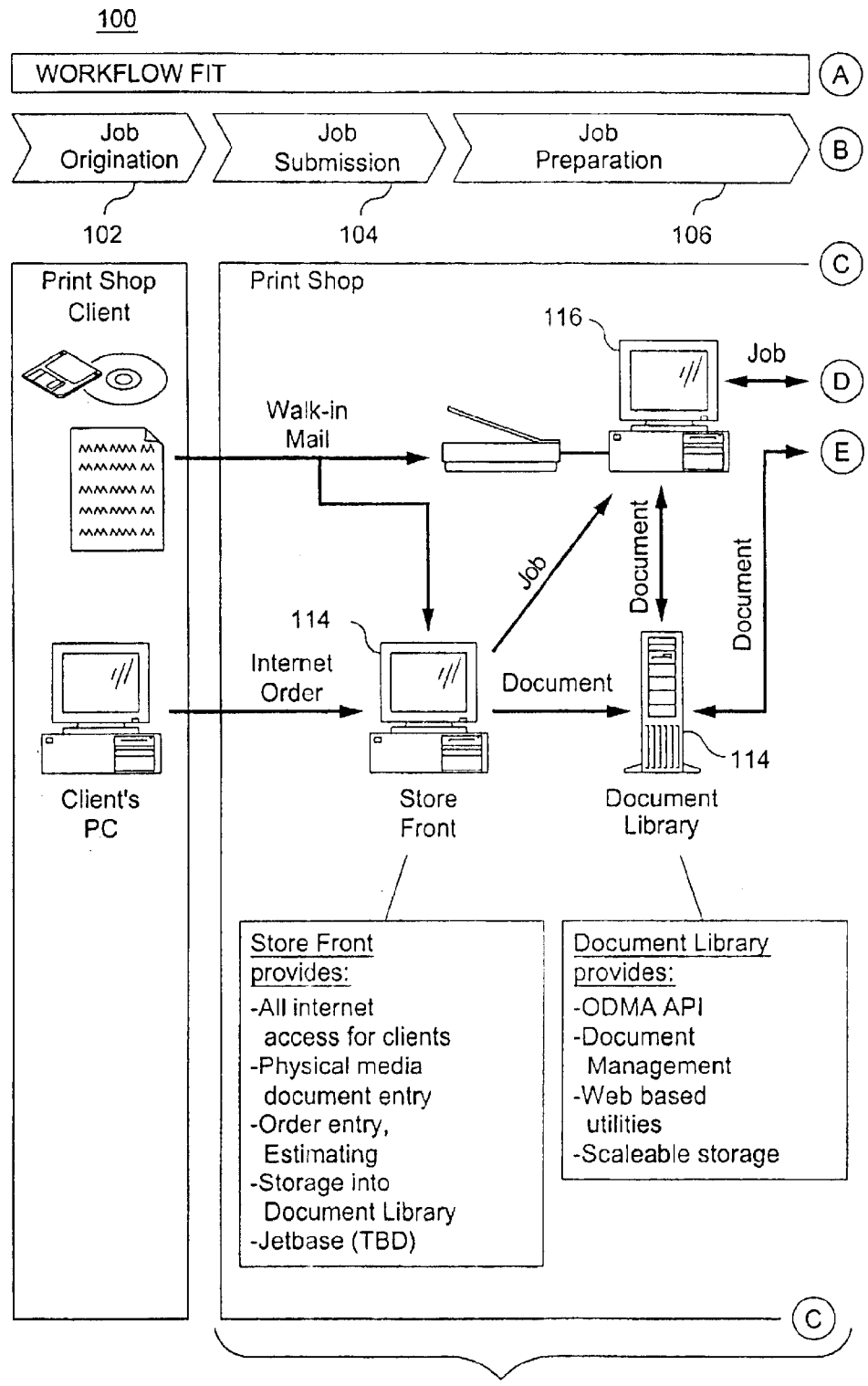
FIG. 1 depicts a flow diagram illustrating a preferred production printing workflow.
Figure 1B:
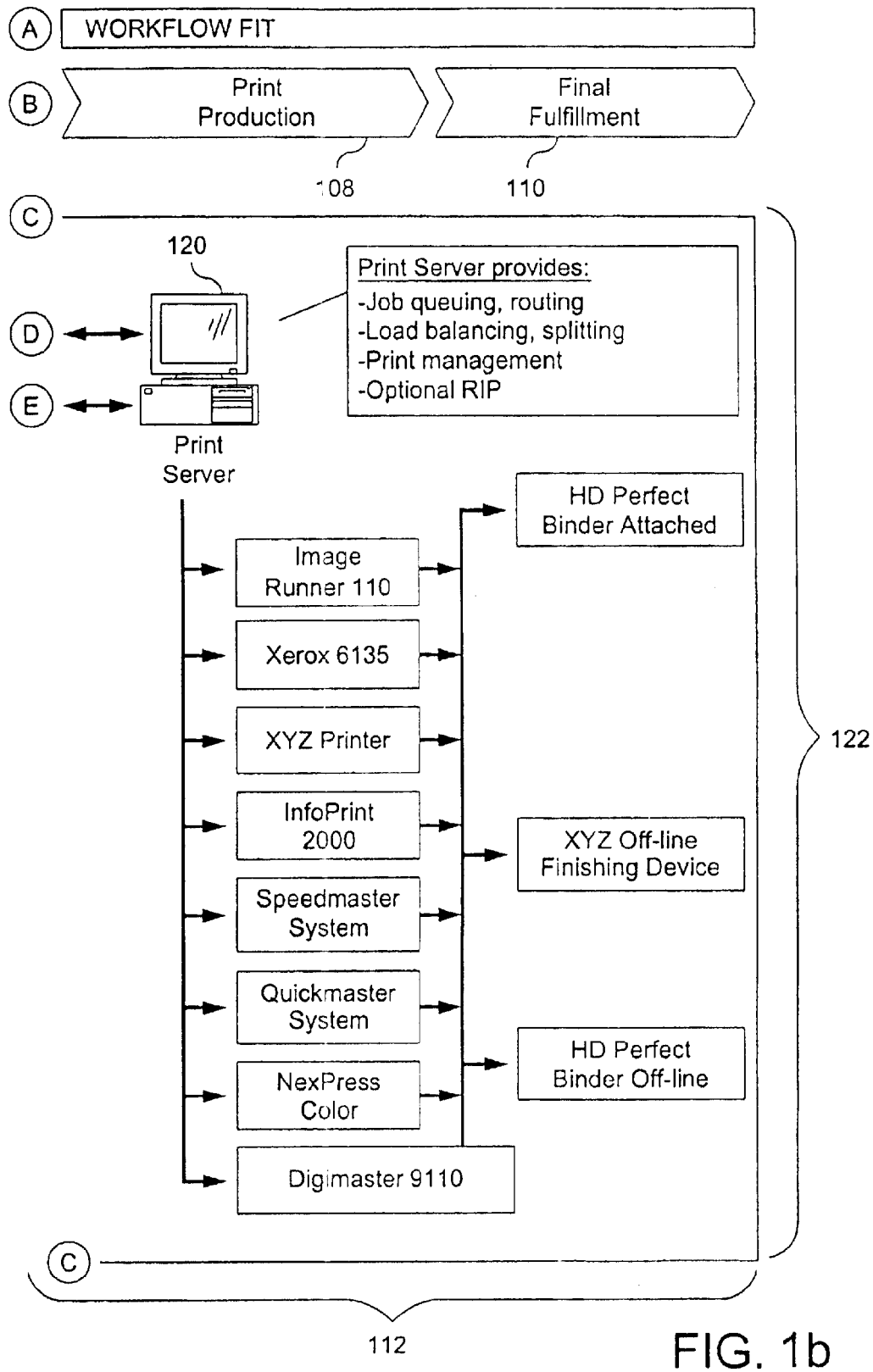

Referring now to FIG. 1, there is shown a flow diagram illustrating the production work flow 100 in a typical production print shop such as a commercial high volume copy or print shop. A workflow is defined as the tasks, procedural steps, organizations or people involved, required input and output information, and tools needed for each step in a business process. As will be discussed below, a workflow approach to analyzing and managing a business or process such as production printing can be combined with an object oriented approach, which tends to focus on the discrete objects and processes involved such as documents, pages, data and databases. For the purposes of this disclosure, the term "object oriented", when applied to the disclosed embodiments, does not imply that an object oriented programming approach is the only method of implementation of the disclosed embodiments.

FIG. 1 further depicts a typical computer network 112 for use in a print shop. In a typical digital print shop, there will be a network 112 of computer work stations 114, 116, servers 118, 120, high volume input device 124, and high volume output devices 122 which make up the computer network 112. The servers 118, 120 include network servers 118 and print servers 120. The topology of the network 112 is typically structured so as to align with the workflow 100 of the print shop. The network 112 may be implemented as a wired or wireless Ethernet network or other form or local area network. Further the network 112 may include wired or wireless connections to wide area networks such as the Internet and connections to other local area networks such as through a virtual private network.

The production workflow 100 includes the procedural stages of job origination 102, job submission 104, job preparation 106, print production 108 and final fulfillment 110. Alternatively, one or more of these procedural stages may be combined as well as there may be other additional procedural stages. Job origination 102 is the procedural stage of receiving the documents and instructions, which together are defined as a "job", from the customer. Job origination 102 can occur when a customer physically brings his job, whether in hard copy or electronic form, to the print shop or otherwise transmits the job to the print shop, whether by phone, fax, postal mail, electronic mail or over a local area or wide area network such as over the Internet. Note that a job may contain more than one document and more than one set of instructions. For example, a job may contain many documents, each being one chapter of a book, along with a document containing a cover for the book. This exemplary job may include the instructions for producing the body of the book from the individual chapter documents and another set of instructions for producing the cover. In addition, as will be discussed below, there may be a third set of instructions for assembling the cover to the body of the book.

Job submission 104 is the receipt of the job by the print shop and the entering of the job into the print shops production system or workflow. Typically the instructions from the customer will be written down on a special form, known as a "ticket" or "job ticket". A ticket may also be electronically created and maintained. Furthermore, predefined tickets may be available for standardized instructions. For example, the shop may have a pad of pre-printed tickets with the instructions to duplicate the documents, three hole punch the final output and assemble the punched final output in a three ring binder. If this is a common request by customers, such pre-printed tickets can save time and resources. All the order taking clerk need do is fill in any customer specific details such as the number of copies to produce. Pre-defined tickets may help to standardize operations and prevent errors in the transcription of instructions from the customer. In very simple print shops, job submission 104 may simply be the receiving of the original documents and instructions along with the creation of a ticket, placing the job in a paper folder and setting it in a physical queue for later handling in subsequent procedural stages.

In print shops which handle jobs electronically, job submission 104 requires entering the job into the shops electronic production system. For documents which are brought in by the customer as hard copy, the documents must first be scanned electronically into the shop's computer system. For documents delivered in electronic form, the document data files must be loaded on the shop's computer system.

For the job submission stage 104, the computer network 112 will include one or more "store front" workstations 114. The store front workstations 114 are computer systems placed at the order taking desk, at a manned clerk's station or set out for customer self service use. These workstations 114 are used for the job submission stage 104 and typically will be configured to handle many different electronic media types such as floppy disk, compact disc, tape, etc. These stations 114 may also be configured to receive jobs over the Internet or other form of network connection with customers. Further, these workstations 114 are typically configured to read many different electronic file formats such as those used by the Microsoft Office™ family of products manufactured by Microsoft Corporation, located in Redmond, Wash. or various other desktop publishing program file formats such as Aldus Pagemaker™ or QuarkXpress™. In addition, these stations 114 can also read "ready for printer" file formats, which will be discussed later, such as Portable Document Format™ ("PDF"), Postscript™ ("PS") or printer control language ("PCL"). Job preparation workstations 116 can also accept image formats such as Tagged Image File Format ("TIFF"), bitmap ("BMP") and PCX. These stations 114 may also include a scanner 124 for scanning hard copies of documents into the computer system. Scanners typically are complicated devices to operate and some print shops may prefer to locate the scanners 124 in the job preparation stage 106 coupled with the job preparation workstations 116 (as shown in the figure) for use solely by trained personnel as will be discussed below. In addition, the store front computers 114 also provide the ability to generate a ticket, electronically or in hard copy form, for the job containing all of the instructions for completing the production printing task. This process of generating the ticket may be automated, involving pre-defined tickets, manual or a combination thereof.

Job preparation 106 involves preparing the documents for printing according to the instructions in the ticket. For documents that are submitted in hard copy form, job preparation 106 may include scanning the documents and creating a faithful and error free electronic reproduction. The documents, once in electronic form, must also be distilled down or converted into a common file format that the print shop can use to both edit and print the documents. This alleviates the need for operators to deal with multiple different programs and eliminates the need to assemble complex documents together for printing using different electronic file formats.

For example, a customer may bring in two different documents, one being the body of a book and the other being the photographs to be inserted at specific pages. The customer may then instruct that the photographs be inserted at particular pages and that the final assembly have continuous page numbers added. The body of the book may be in Microsoft Word™ format while the images of the photographs are in Adobe Photoshop™ format. While the operator could figure out at which pages the images will be inserted and appropriately number the pages of the book and photographs using each individual software package, this is a very complex and time consuming process. It also requires that the operator be trained and familiar with a range of software packages and runs the risk that he will not be familiar with the particular package that the customer used. Therefore, it is more efficient to distill each of the various file formats into a unified format which allows the operator to prepare the job using a single software interface. In the preferred embodiments, all documents, whether provided in hard copy or electronically, are distilled or converted into a "ready for printer" or "print ready" file format. In the preferred embodiments, the Portable Document Format™ is used as the ready for printer format, developed by Adobe Systems, Inc., located in San Jose, Calif.

A ready for printer file format is defined as a file format which contains both the data to be printed along with printer control instructions that can be directly interpreted by the internal processing engine of a printer or other form of hard copy output device in order to rasterize the data image onto the output media. Rasterization is the placement of image data at a specific location on the output media. Such file formats include Portable Document Format™ ("PDF") and Postscript™ ("PS") both manufactured by Adobe Systems, Inc., located in San Jose, Calif., as well as printer control language ("PCL"), manufactured by Hewlett Packard, located in Palo Alto, Calif. Examples of non-ready for printer formats include the native application file formats for personal computer application programs such as Microsoft Word™. These file formats must be first converted to a ready for printer file format before they can be printed. Furthermore, some image file formats, such as the Tagged Image File Format ("TIFF") contain bit image data only which is already in a format which specifies its output location on the output media and does not contain printer control instructions for interpretation by the internal processing engine of the printer and therefore, for the purposes of this disclosure, is not a ready for printer file format. By using a ready for printer format, rasterization of the image data can be delayed as close as possible to the final placement of the image data on the output media. This allows the most efficient use of the production print device 122 by allowing its internal control logic to optimize the rasterization process resulting in output that is more likely to match with the operator's expectations.

For the job preparation stage 106, the computer network 106 includes job preparation workstations 116, scanners 124 and network servers 118 coupled with the store front workstations 114 over the network 112. Herein, the phrase "coupled with" is defined to mean directly connected to or indirectly connected with through one or more intermediate components. Such intermediate components may include both hardware and software based components. The job preparation workstations 116 preferably execute workflow management software which allows the operator to manage, edit and print jobs. The network server(s) 118 includes a document library which allows manipulation, management, storage and archiving of jobs, or just there respective documents and/or tickets, as well as facilitates and manages the flow of jobs from the store front computers 114 to the job preparation workstations 116 and from the job preparation workstations 116 to the print servers 120 or the production output devices 122. Exemplary document libraries include Intra. Doc™ document management system manufactured by Intranet Solutions, Inc., located in Eden Prairie, Minn. and the DOCFusion document management system manufactured by Hummingbird, Inc., located in York, Ontario, Canada. In the preferred embodiment, the job preparation workstations 116 are Imagesmart™ Workstations, manufactured by Heidelberg Digital, L.L.C., located in Rochester, N.Y. Alternatively, an appropriate computer hardware platform such as that comprising a Pentium™ class processor or better, manufactured by Intel Corporation, located in Santa Clara, Calif., 64 megabytes of RAM or more, a 20 gigabyte hard disk or larger and appropriate display device may be used. Further, in the preferred embodiment, the network servers 118 preferably comply with the Open Document Management Architecture ("ODMA") standard and provide document management capabilities and scaleable storage.

The job preparation workstations 116 also provide the capability of the print shop to add value to the print production process by offering services to the customer. Such services include the ability to modify documents provided by the customer to add features that the customer could not or would not add himself. Such features include adding page numbers across multiple documents, bates numbering, adjusting page layout for tab stock and aligning the output to account for binding. Further the job preparation workstations 116 provide the capability to fix errors in the documents such as removing artifacts in scanned images and masking over unwanted text or markings. The job preparation workstations 116 can also be used to prevent inaccuracies in the finished output caused by the printing or binding process. Such inaccuracies include binder's creep which happens after a document is imposed into a booklet/pamphlet using a signature imposition. Binder's creep occurs when the placement of the images on the paper fails to account for the thickness of the binding as a function of the number of pages in the book causing the image on the pages to shift inward as you get closer to the cover. Binder's creep is prevented by shifting image slightly when performing the signature imposition on the document. In addition, the job preparation workstation 116 allows the operator to manage and layout the document pages for final output, also known as "imposition" and "signature imposition". In addition, the operator can shuffle pages, reverse pages, insert blank pages, trim and shift pages, create bleeds and place multiple pages on a sheet, also known as "n-up" to create proof sets, brochures or pamphlets, etc. Further the job preparation workstation 116 permits the operator to add annotations to the document such as bates numbers, page numbers, logos and watermarks. All of these service add value to the final output. Formatting and other modifications to the document can be globally applied to the entire document, such as a shifted margin or may be applied only to select pages. Such alterations to the document are known as document/page features or attributes. Further, these alterations are also known as document or page exceptions since they typically override specific instances of the original document formatting as set by the customer.

The next stage in the print production workflow 100 is the print production stage 108. In the print production stage 108, the final form of the documents for printing is sent to a print server 120 which will distribute the job to the final output device 122. In manual print shops, this stage 108 would be similar to an operator manually taking the ready for production job over to the desired output device 122 to start the job. The print production stage 108 manages the output resources of the print shop. Such management includes queuing jobs to the proper devices 122 in the shop, routing jobs to available devices 122, balancing the load placed on the various devices 122, and pre-processing jobs, such as splitting or RIP'ing the job, prior to sending it to a particular device 122. RIP stands for Raster Image Processor and is the hardware and/or software which converts ready for printer data into raster images. It is also a common term for rasterizing a page image on to the output media.

The print server 120 used in the print production stage 108 is coupled with the job preparation workstations 116 and the network server 118 over the network 112. Further, the print server 120 is coupled with the various output devices 122 in the print shop. Note that some output devices 122 may not support electronic transfer of the data to be output and may require a manual step for operation. Such devices may include a special binding machine which requires that the partially finished documents be manually transferred to the binding machine to complete the production. The print server 120 is preferably implemented as a separate computer coupled with the network 112, however, software based print servers running on a network server 118, job preparation workstation 116 or store front workstation 114 may also be used. In the preferred embodiment, the printer server 120 includes an independent computer workstation, typically running a UNIX or Windows NT operating system, a software print server engine and a software print server application. The print server application offers the user interface ability to configure and manage the print server operation. The print server engine performs the automated processes of the print server. These processes include spooling and queuing jobs and job content (i.e. the document), directing the jobs to specific production output devices based on the attributes of the print job and how these attributes are satisfied by the print engine, load balancing jobs among the various production output devices to keep all printers fully utilized, e.g. to split color from black and white jobs, and acting as a communication gateway where it can accept multiple input communication and print protocols translating them to the communication and print protocol the production output device 122 understands.

The final stage of the production printing workflow 100 is the final fulfillment stage 110. The final fulfillment stage 110 is the stage where the finished output is produced on the production output device 122. A production output device is a computer output device, such as a printer, designed for high volume production of printed documents. Such devices preferably include the ability to produce large quantities of documents with mixed media types and various degrees of finishing, such as stapling or binding, at very high speed. Exemplary output devices include the Digimaster™ Digital High Volume Printer manufactured by Heidelberg Digital, L.L.C., located in Rochester, N.Y. and the NexPress™ Color printer manufactured by NexPress, Corporation, located in Rochester, N.Y.

Figure 2:
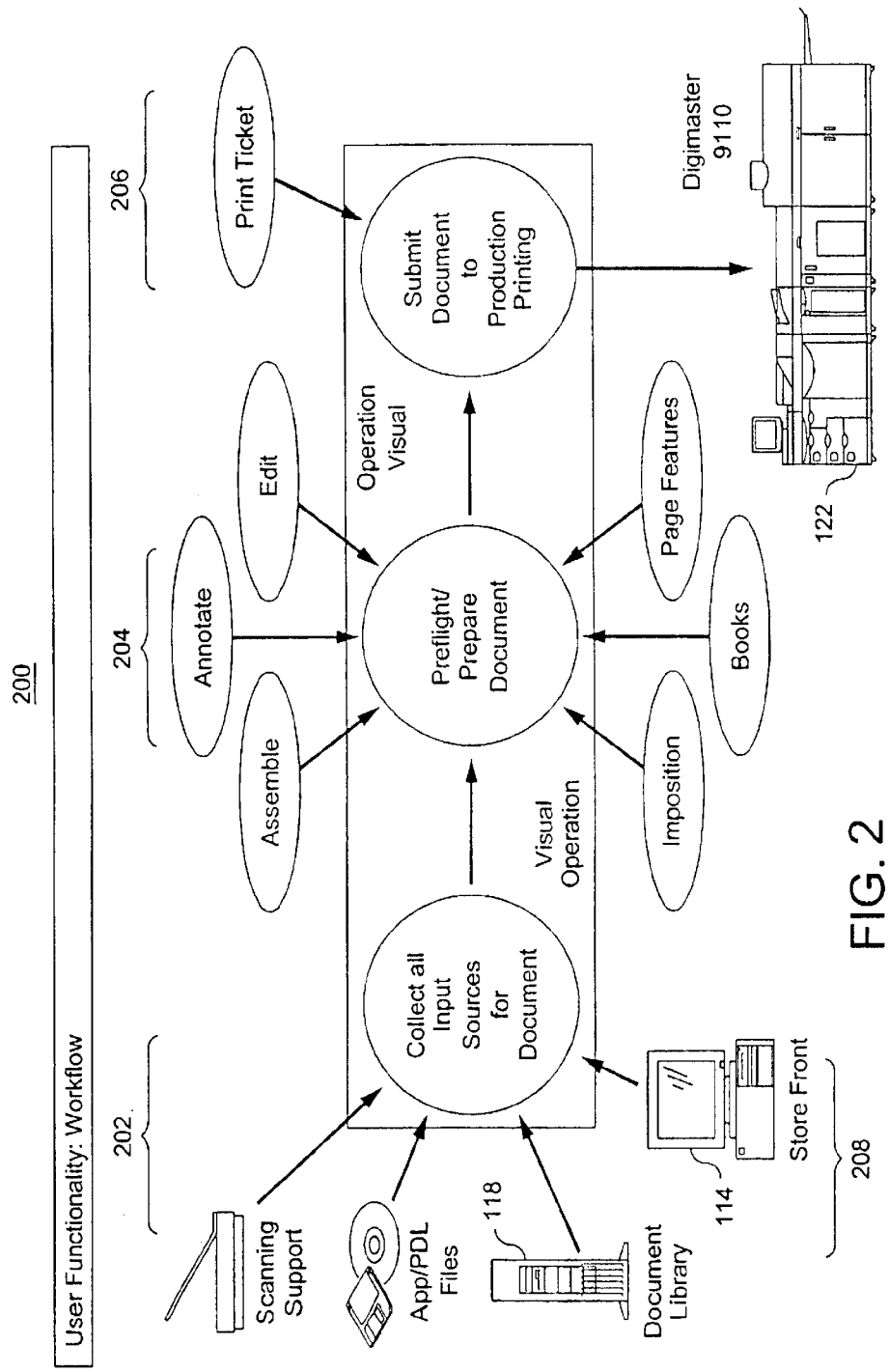
FIG. 2 depicts a flow diagram showing the user functionality workflow of the preferred embodiment

Referring now to FIG. 2, there is shown a flow diagram showing the user functionality workflow 200 of the preferred embodiment job submission and preparation stages 104, 106. The user workflow 200 includes an input source stage 202, a preflight stage 204 and a production stage 206. In the input source stage 202, all of the documents of the job are collected together from the different input sources 208. As detailed above, all of the collected documents are converted to a ready for printer format, preferably a Portable Document Format™. This conversion can be a manual or automated process or a combination thereof. For example, a special directory can be created on the network server 118 where data files in various file formats can be placed, for example, by the clerk who accepts the documents from the customer and inputs them into the store front workstation 114. Automated logic which watches this directory, will see the placement of files and automatically convert them (or flag them for manual conversion) into a ready for printer format. Any documents which the automated logic cannot handle can be flagged for manual conversion. The converted documents are then passed to preflight stage 204 where they are prepared for production. This transfer of converted documents can occur by moving the documents to a special directory on the network server 118 where they can be accessed by the job preparation workstations 116 or by transmitting the documents to the job preparation workstation 116. This process can be manual or automated and may involve placing the documents in a queue of documents waiting to be prepared for production. Further, this process may include a manual or automated determination of the capabilities, skill level or training level of the various operators currently logged into the available job preparation workstations 116 as well as the current load/backlog of job in their respective queues. Taking these factors into account, job can be automatically or manually routed to the operator best able to handle the job both technically and in an expedient manner. This functionality can be implemented by creating an operator database which tracks the capabilities, skill level and training level of the various operators who work in the print shop. This database can be coupled with queue management software which balances the loads/backlogs of job at each station 116.

In the preflight stage 204, the documents can be assembled, such as in a book, annotated, edited, and have imposition or other page features applied. Once the documents are prepared for production, they are passed to the production stage 206. In the production stage 206, the prepared documents along with the production instructions (from the tickets) are submitted to the print server or directly to the production output device 122 using a file downloader such as the Print File Downloader™ application program manufactured by Heidelberg Digital, L.L.C., located in Rochester, N.Y. This user functionality workflow 116 may be implemented as a combination of hardware, software and manually executed components and may involve one or more of the components detailed in the production printing workflow above.

For more information on the production printing workflow, see U.S. patent application Ser. No. 09/573,368, entitled "SYSTEM AND METHOD FOR REPRESENTING AND MANAGING PAGES IN A PRODUCTION PRINTING WORKFLOW", filed May 17, 2000. U.S. patent application Ser. No. 09/573,026, entitled "SYSTEM AND METHOD FOR REPRESENTING AND CONTROLLING A PRODUCTION PRINTING WORKFLOW", filed May 17, 2000, now U.S. Pat. No. 6,411,314, U.S. patent application Ser. No. 09/572,108, entitled "EFFICIENT USE OF PRINT RESOURCES WITHIN A JOB STREAM", filed May 17, 2000, now U.S. Pat. No. 6,407,820, U.S. patent application Ser. No. 09/572,341, entitled "SYSTEM AND METHOD FOR IMPLEMENTING COMPOUND DOCUMENTS IN A PRODUCTION PRINTING WORKFLOW", filed May 17, 2000, U.S. patent application Ser. No. 09/573,093, entitled "SYSTEM AND METHOD FOR VISUAL REPRESENTATION OF PAGES IN A PRODUCTION PRINTING WORKFLOW", filed May 17, 2000, now U.S. Pat. No. 6,462,756, and U.S. patent application Ser. No. 09/572,478, entitled "INTERACTIVE HARDCOPY RE-SAMPLING WITHOUT RE-SCANNING", filed May 17, 2000, now U.S. Pat. No. 6,437,878.

When a job is brought into the print shop in hard copy form, it must first be scanned into the shop's computer system as described above. The scanning takes place in the job submission 104 or the job preparation 106 stages of the shop's workflow. Typically, the document is loaded into an automated paper feeder of a production/high volume scanner 124 which is coupled with the job preparation workstations 116 (the "scanner host" or "scanner host workstation"). In the preferred embodiment, the production scanner 124 is an ImageDirect Scanner, manufactured by Heidelberg Digital, L.L.C., located in Rochester, N.Y. The operator then initiates and controls the scan from the job preparation workstation 116 coupled with the scanner 124. The operator interacts with the scanner 124 using a scanning application program. loaded on the job preparation workstation 116. The scanning application provides the ability to set the scanner parameters, initiate and control scans and view the results of the scan. The scanning application is typically a computer program written by a third party company different from the manufacturer of the scanner 124 or the job preparation workstation 116, one example is Adobe Systems, Inc., located in San Jose, Calif.

As is known in the art, application programs executing on a computer workstation interface with external hardware devices coupled with that workstation using interface programs called drivers. A driver acts like a translator between the device and programs that use the device. Each device coupled with a computer typically has its own set of specialized commands that only its driver knows. In contrast, most application programs only know how to access these devices by using generic commands. The driver, therefore, accepts generic commands from an application program and then translates them into specialized commands for the device. Essentially, the path between the operating system and virtually all hardware not located directly on the computer's motherboard goes through these special driver programs. Much of a driver's function is as translator between the electrical signals of the hardware sub-systems and the high-level programming languages of the operating system and application programs. For example, drivers take data that the operating system has defined as a file and translates them into streams of bits placed in specific locations on storage devices, or a series of laser pulses in a printer. Because there are such wide differences in the types of hardware controlled through drivers, there are necessarily differences in the way that the driver programs function, however most drivers are executed when the device is required, and function much the same as any other process. The operating system will frequently assign high priority memory blocks to drivers so that the hardware resource can be released and readied for further use as quickly as possible. One reason that drivers are separate from the operating system is so that new functions can be added to the driver- and thus to the hardware subsystems-without requiring the operating system itself to be modified, recompiled and redistributed. Through the development of new hardware device drivers, such development often performed or paid for by the manufacturer of the subsystems rather than the publisher of the operating system, input/output capabilities of the overall system can be greatly enhanced.

An exemplary driver program is a printer driver which allows an application program to print output on a printer coupled with the workstation, whether directly or indirectly, such as over a network. Different printers manufactured by different companies typically offer different features and utilize different commands which are proprietary to that company. As explained above, a driver program allows a layer of abstraction between an application program and the variety of available printers so that the application program does not need to maintain its own ability to utilize all of the different printers that are available or be upgraded to handle later developed devices. The driver provides a standard software interface for the application program to interact with, typically referred to as an Application Program Interface or API. The driver then translates those generic interactions into the device specific commands to control the attached device. In addition, drivers can also present a user interface for controlling vendor specific functions of the particular device. For example, a printer that supports duplexing can be interfaced with using a driver that can present a user interface allowing the operator to choose the duplexing function. Further, the driver is also programmed to control the specific hardware interface that connects the device to the workstation. Such hardware interfaces include Small Computer System Interface ("SCSI"), Universal Serial Bus ("USB"), serial, parallel, and IEEE 1394 ("FireWire") as are known in the art. If a different device is attached, a user need only load a new driver to allow the application program to interact with the new hardware. Scanners 124 are typically physically coupled with the job preparation workstations 116 utilizing a SCSI interface.

Scanner drivers are typically of two types, TWAIN, as defined by the TWAIN group located in Boulder Creek, Calif. and the Image and Scanner Interface Specification ("ISIS") developed by Pixel Translations, Inc., located in San Jose, Calif. and also specified via American National Standards Institute specification ANSI/AIIM MS61-1996. While TWAIN and ISIS based drivers provide the basic functionality required for low volume scanning, they typically prove inadequate for the needs of production/high volume scanning as is done in a production print shop. Such needs include the abilities to scan multiple high volume originals, continuously at high resolution and high speed coupled with efficient error detection, correction and diagnostic capabilities. Further, print shops often need to simultaneously operate multiple scanners 124 manufactured by different manufacturers in an efficient manner and with a minimum of resources. This usually requires that multiple scanners 124 be connected to and operated from one job preparation workstation 116 by a sole operator.

Drivers written under the TWAIN specification are job oriented. A job is defined as a collection of all of the scanning attributes, e.g. the scanning and image processing attributes such as image resolution and bit depth, all of the constant/scanner-independent attributes such as paper plex (simplex or duplex) and attributes specific to the particular scanner such as bar code reading capability. TWAIN drivers set up all of the job parameters and then initiate the scan. Once initiated, however, the parameters cannot be altered until the scan is completed or halted. Therefore, if a parameter is set incorrectly, the scan needs to be stopped and completely restarted. This can be problematic if, for example, a scan error occurs on the 10th page of a 100 page document. In this example, the scan must be allowed to complete before the scanner 124 can be adjusted to account for the error or the scan must be stopped, re-loaded and re-started, incurring significant delay in either case.

Further, TWAIN based drivers deliver the scanned document one image at a time from the scanner hardware interface to the scanning application. This means that the driver must handshake each image (i.e. interrupt the application, establish a connection and deliver the data) to the application program from the hardware interface of the scanner. This creates unnecessary overhead for the application program, especially in high volume environments and in cases where a single scanning application is being utilized to manage multiple scanners 124 which are simultaneously scanning. In addition, while TWAIN drivers support the connection of multiple scanners to the same workstation, they do not support multiple scanners being operated simultaneously from the same workstation. The operator must choose one particular scanner 124 to use for scanning at any given time and wait for that scan to complete before choosing a different scanner 124.

ISIS drivers are device/scanner specific drivers and do not provide a user interface to the scanner. Instead, ISIS drivers require that the application program provide the user interface to the scanner. Further, the ISIS standard fails to provide a comprehensive method of defining scanner jobs like the TWAIN standard does through its extensive use of user specifiable attributes. ISIS interfaces do not provide the ability to display a scanner specific user interface, like TWAIN drivers do, in order for the user to setup the scanner job. The ISIS approach is to require the application to provide all of the user interface software. This approach is functional in the case of a scanning application that needs to be able to work with multiple types of scanners 124 while providing a coherent user interface in the use of those scanners 124. ISIS is not as robust as TWAIN in providing a comprehensive method to define the scanner job. Often the scanner vendor needs to request enhancements to the application program interface ("API") of ISIS in order to perform the functionality required. Further, after the application performs the necessary interaction with the ISIS API to start the scanning process for a set of original documents loaded in the scanner's 124 automatic sheet feeder, the ISIS driver consumes all of the computing power of the host computer until the entire document has been scanned in. Finally, ISIS based drivers do not support multiple scanners being operated simultaneously from the same workstation. Applications written for ISIS drivers assume that only one driver is loaded on the host computer.

Both TWAIN and ISIS based drivers further lack the ability to supply real-time information back to the scanning host workstation computer. Such real time information or status data includes status information such as lamp temperature and scanner parameter settings. Status data further includes information about scanning events such as a paper mis-feed or lamp-failures. By real time, it is meant that status data can be provided back to the scanning application while the scan is progressing and without waiting until the scan completes. Real time is a level of computer responsiveness that a user senses as sufficiently immediate or that enables the computer to keep up with some external process (for example, to present visualizations of the weather as it constantly changes).

The present embodiments describe an improved scanner interface solution for application developers referred to herein as a Virtual Scanner Driver or VSD. The preferred embodiments comprise the ability to have a single application communicate with a single API independent of the brand of scanner 124 which is coupled with the job preparation workstation 116. Further, a personality module or PM is provided which encompasses the vendor specific functionality of the particular scanner 124 coupled with the job preparation workstation 124. The PM interfaces the VSD API to the scanner 124. The PM accommodates three aspects of scanning: the communications method to the scanner 124 (USB, SCSI, serial, parallel, FireWire, etc.), the delivery method of the image data and status data coming from the scanner 124 and any enhanced image processing required over and above that provided by the scanner 124 itself.

By providing a PM loaded on the job preparation workstation 116 for each type of scanner 124 coupled with the workstation 116, the VSD can automatically utilize the appropriate PM when instructed to initiate a scan on a particular scanner 124 by the scanning application. The VSD dynamically chooses which PM to use based on the scanner 124 chosen by the operator.

Further, the VSD and PM facilitate, or enable, real time communications between the scanner 124 and the workstation 116, i.e. the VSD and PM enable the scanner 124 to send image and/or status data to the workstation 116 and the workstation 116 to send commands to the scanner 124 while a scan is in progress on the scanner 124. For example, the VSD provides real-time feedback of scanner 124 status data, including scanner status, events and other telemetry data provided by the scanner 124. This information is provided while a scan is in progress and once the scan completes. This information can be used by the operator to adjust the scan parameters while the scan is progressing without the need to halt or restart the scan. This is useful when the scan quality is slowly degrading but not yet at a point where the scan job is compromised. In such situations, a real-time adjustment, i.e., a command from the workstation 116, can improve the scan quality and eliminate the degradation without the delay of halting and/or restarting the scan. Further, applications such as diagnostic applications can utilize the real-time feedback provided by the VSD to detect impending hardware failures such lamp failures. Automated scan quality applications can monitor the quality of scans in progress and automatically adjust various scanner parameters and image processing algorithms to correct for degradation in quality such as dust on the scanner glass or skewed images caused by a mis-fed original. Such applications can further automate the scanning process and reduce operator errors, thereby improving efficiency and throughput.

In addition, the VSD delivers image data to the scanning application without handshaking each image to the application. In the preferred embodiments, image data, typically consisting of individual image files for each scanned page of a document, is delivered to a buffer storage commonly accessible to the VSD and the scanning application, preferably located within the job preparation workstations 116 file system. This buffer storage can be located in random access memory, on a local hard disk or on a network disk. In the preferred embodiments, the VSD utilizes a Uniform Resource Locator as specified by the Hypertext Transfer Protocol, to provide a uniform and universal file based delivery method which is independent of the device hardware coupled with the job preparation workstation 116. It will be appreciated that other file delivery protocols can also be used including File Transfer Protocol ("FTP" and "TFTP") and Network File System ("NFS") as are known in the art. By delivering the image data to a buffer storage, the scanning application can retrieve the image data asynchronously when it needs the data. This allows the scanning application to efficiently operate and support the simultaneous operation of multiple scanners from the same scanning application and job preparation workstation 116. Further, this allows the VSD to execute the delivery of image data at substantially the same speed as the rated speed of the scanner 124 even when multiple scanners 124 are operating. In the case of the preferred scanner, the ImageDirect scanner, this rate is 65 pages per minute.

Figure 3:
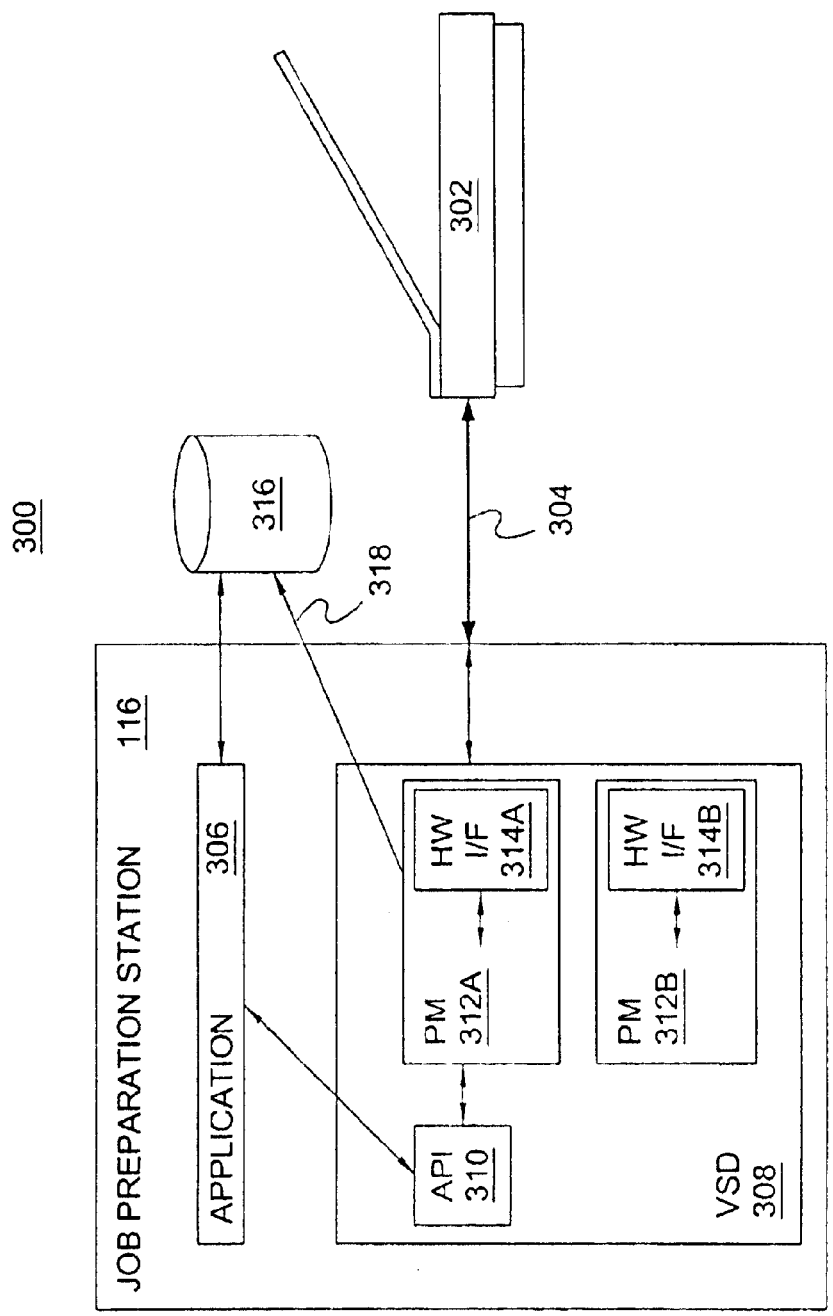
FIG. 3 depicts a block diagram of a scanner interface according to a first embodiment.

Referring now to FIG. 3 there is shown a block diagram of a production scanning system utilizing a first embodiment of a VSD 308. The system 300 includes a job preparation workstation 116, a scanner 302, a scanning application 306 and a buffer storage 316. The job preparation workstation 116 is preferably a Scan Host™ Station as used by the Digimaster™ 9110, manufactured by Heidelberg Digital, L.L.C., located in Rochester, N.Y. Alternatively, an appropriate computer hardware platform such as that comprising a Pentium™ class processor or better, manufactured by Intel Corporation, located in Santa Clara, Calif., 64 megabytes of RAM or more, a 20 gigabyte hard disk or larger and appropriate display device may be used. Further the scanner 302 is preferably an ImageDirect Scanner also manufactured by Heidelberg Digital L.L.C. The scanner 302 is coupled with the job preparation workstation 116 using a hardware interface 304. The hardware interface 304 is preferably a SCSI interface. Alternatively, the hardware interface 304 can be a USB, FireWire, serial or parallel interface. Further, the scanner 302 can be coupled with the job preparation workstation 116 via a network utilizing an Ethernet or other comparable network interface/architecture as is known in the art. Preferably, the hardware interface 304 supports high bandwidth, high throughput bi-directional communications. The buffer storage 316 is preferably a hard disk drive coupled with the job preparation workstation's 116 file system, and preferably physically connected with the station 116. In alternative embodiments, the buffer storage 306 may be a random access memory, a dedicated hard drive coupled with the scanner 302 or a remote disk drive such as a network drive. It is preferred that the operating system of the job preparation workstation 116 allow common access to the buffer storage 316 from both the scanning application 306 and the VSD 308.

The scanning application 306 is a software program executing on the job preparation workstation 116 which allows an operator to initiate and control scan jobs as well as view and manipulate the results of the scans, such as editing the resultant images, or by sending the results to a production printer 122. In the preferred embodiments, the scanning application 306 is the Scan Host™ software as used by the Digimaster 9110, manufactured by Heidelberg Digital, L.L.C., located in Rochester, N.Y. The system 300 further includes the VSD 308 which is coupled with the scanning application 306. The scanning application 306 communicates with the VSD 308 via the VSD's 308 API 310 as is known in the art. The API 310 provides a coherent uniform user interface to the various scanners 302 that can be used by the scanning application 306. This API 310 is described in more detail in Appendix A. The VSD 308 further includes one or more PM's 312A, B. A PM 312A, B is defined for each of the scanners 302 which are connected or capable of being connected with the job preparation workstation 116. The PM 312A, B bridges the interface gap between the API 310 and the hardware interface 304 to the scanner 302. The PM 312A, B encompasses the scanner specific attributes of the particular scanner 302 and translates the generic commands from the API 310 into the specific commands which the scanner 302 understands. Further, the PM 312A, B includes the hardware interface connectivity 314A, B which formats and transmits those commands over the particular hardware interface 304 used to connect the scanner 302 to the job preparation workstation 116. The PM 312A, B accommodates the communications interface to the scanner device 302 so the scanning application 306 does not have to deal with this aspect. This includes initializing and maintaining the communications. As described above, the communication's interface can a SCSI, FireWire, Fibre Channel, USB, Serial or Parallel, etc. type interface. The PM 312A, B further provides a direct interface 318 to the buffer storage 316. This allows the PM 312A, B to deliver image data from the scanner 302 to the buffer storage 316 where the scanning application 306 can asynchronously retrieve it. The PM 312A, B is responsible for delivering the scanned image data to the destination buffer storage 316 which may be located locally on the job preparation station 116 or remotely, such as on a network drive. To enable image data delivery to a remote buffer storage 316, the PM 312A, B may employ some form of file system protocol such as FTP or NFS or other protocol such as HTTP as described above. Finally, the PM 312A, B identifies and provides image processing features that may not be supported (are not native) on the scanner device 302 itself. Where a particular image processing feature is not available on the scanner 302, the PM 312A, B provides a software substitute. In this way, the VSD 308 can present a uniform feature set to the scanning application 306 and is not limited by the actual available feature set of the scanner 302. The preferred scanner interface implemented by a PM 312A, B is described in more detail in Appendix C. In this way, the VSD 308 is logically partitioned into the common API 310 which interfaces to the scanning applications 306 and the PM 312A, B which embodies scanner/vendor specific interface attributes. Further, as was discussed above, the API 310 is capable of receiving commands from the scanning application 306 and passing them on to the PM 312A, B, and the PM 312A, B is capable of passing those commands onto the scanner 302 while a scan is in progress and while image or status data is being transferred from the scanner 302 to the PM 312A, B which transmits it to the buffer storage 316 for later retrieval by the scanning application 306, thereby facilitating/enabling real time communication between the scanner 302 and the scanning application 306/workstation 116. For more detail on the software architecture of the VSD 308, refer to Appendix B.

Figure 4:
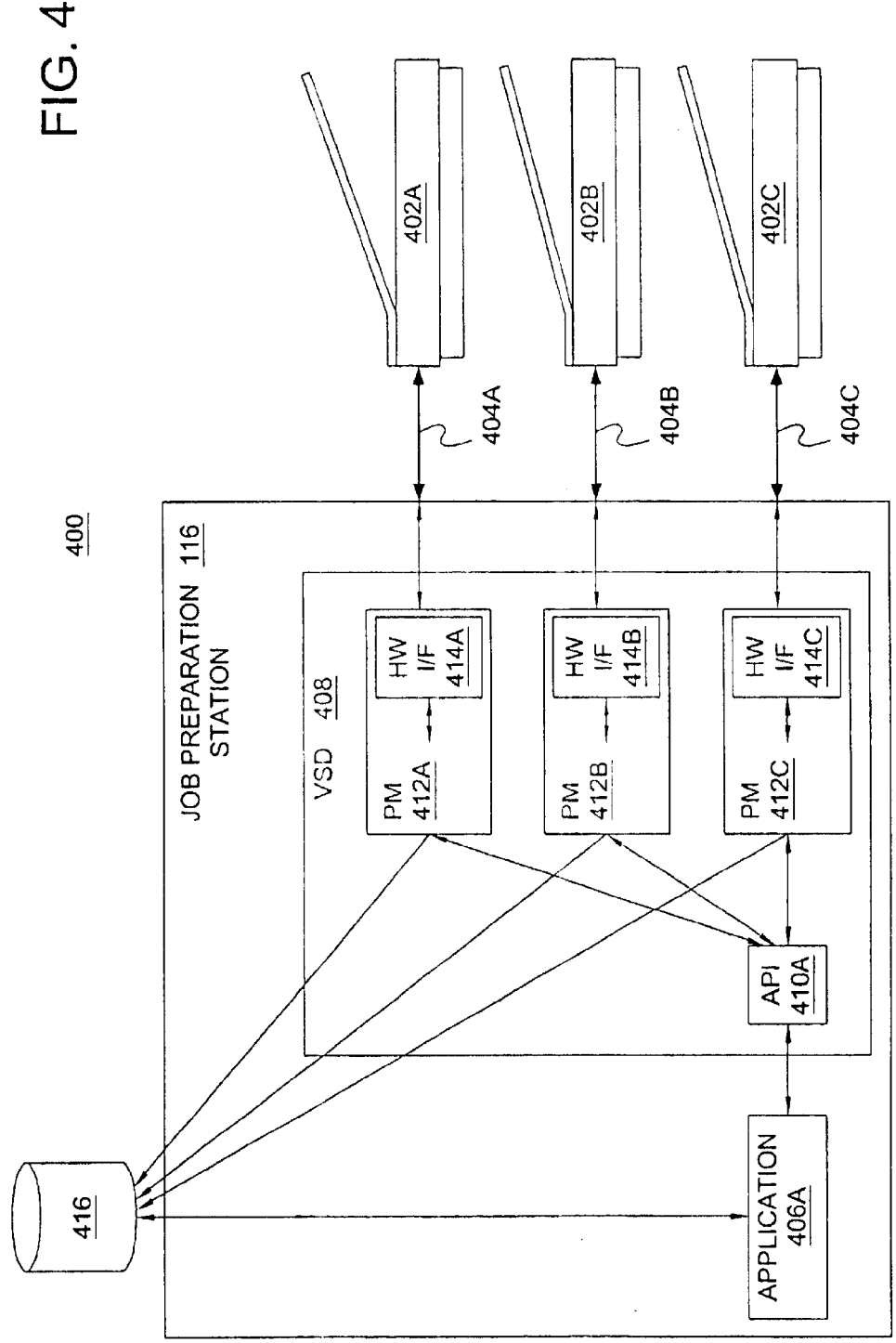
FIG. 4 depicts a block diagram of a scanner interface according to a second embodiment.

Referring now to FIG. 4 there is shown a block diagram of a second scanning system 400 utilizing a second embodiment of a VSD 408. This figure shows a scanning system 400 capable of simultaneously utilizing multiple scanners 402A–C. The scanning system 400 includes a job preparation workstation 116 coupled with scanners 402A–C using hardware interfaces 404A–C. It will be appreciated that each scanner 402A–C may be of a different type and may connect with the job preparation workstation 116 using a different hardware interface 404A–C as described above. Further, the scanning system 400 includes a commonly accessible buffer storage area 416, as described above, to allow the PM's 414A–C to deliver image data at the scanner's 402A–C rated speed and allow the scanning application 406 to asynchronously retrieve the image data without the need for handshaking.

FIG. 4 further shows PM's 414A–C coupled with the VSD API 410. These PM's 414A–C operate as described above for the embodiment of FIG. 3. Essentially, the scanning application 406 initiates scans on the scanners 402A–C by sending the appropriate commands to the VSD API 410. The API 410 then loads the appropriate PM's 412A–C for each scanner 402A–C. Each PM 412A–C can coexist and co-execute in a substantially parallel fashion with the other PM's 412A–C allowing simultaneous operation of the scanners 402A–C from the single scanning application 406 and VSD API 410. Further, the VSD API 410 and PM's 412A–C facilitate/enable the scanning application 406/workstation 116 to communicate with/operate and receive image data from one or more of the scanners 402A–C in real time as scans are progressing on those scanners 402A–C as described above. In alternative embodiments, such simultaneous scanning capability can be implemented by allowing multiple scanning applications 406 to execute and operate in a substantially parallel fashion on the job preparation workstation 116. Such multitasking is well known in the art. Further, the scanning application 406 can communicate with a single VSD API 408 with multiple PM's 412A–C controlling multiple scanners 402A–C as described or, alternatively, the VSD API 408 can, itself, be instantiated multiple times on the job preparation workstation 116 with each PM 412A–C.

In addition, appendices A–E are also included. Appendix A describes the interface specification of the VSD API in more detail. Appendix B describes the software architecture of the VSD in more detail. Appendix C describes the SCSI based user interface of the preferred scanner as implemented by the VSD PM. Appendix D describes the SCSI based diagnostic interface of the preferred scanner as implemented by the VSD PM.

Referring to Appendix, E, there is include computer code of an exemplary VSD and PM for the Preferred Imagedirect scanner. This code is intended to be compiled on a computer system comprising 64 Mb or more of random access memory, 20 GB or larger hard disk and a Pentium class processor, or better, manufactured by Intel Corporation, located in Santa Clara, Calif. as is known the art. Further, this code is intended to be compiled using Microsoft Visual Studio version 6.0 manufactured by Microsoft Corporation, located in Redmond, Wash. One of ordinary skill in the art will appreciate that the code files must be loaded into a directory structure as specified in pages 1–4 of the appendix. Once loaded, the make files must be executed as is known to compile and execute the VSD code.

It is therefore intended that the foregoing detailed description be regarded as illustrative rather than limiting, and that it be understood that it is the following claims, including all equivalents, that are intended to define the spirit and scope of this invention.

We claim:

1. A driver for interfacing a first application program to a first scanner, said first application program operative to transmit commands to said first scanner and said first scanner operative to scan a document and transmit image data and status data from said scan to said first application program, said driver comprising:
    an application program interface ("API") coupled with said first application program and operative to receive said commands from said first application program;
    a first scanner personality module ("SPM") coupled with said API and said first scanner and operative to receive said image data and said status data from said first scanner and provide said image data and said status data to said first application program and transmit said commands to said first scanner; and
    wherein said API and said first SPM facilitate real time communication between said first application program and said first scanner.

2. The driver of claim 1, wherein said first scanner is of a first type, said SPM being associated with said first type, said driver further comprising a second SPM coupled with said first API and associated with a scanner of a second type.

3. The driver of claim 1, wherein said first SPM is further operative to simultaneously receive said image data and said status data from said first scanner while transmitting said commands to said first scanner.

4. The driver of claim 1, wherein said first API is further operative to provide said image data to a buffer asynchronously accessible by said first application program.

5. The driver of claim 4, wherein said buffer comprises a hard disk.

6. The driver of claim 1, wherein said first SPM is further operative to substantially simultaneously transmit said commands to said first scanner while said scan is in progress.

7. The driver of claim 6, wherein said commands comprise commands to adjust scan quality.

8. A system implemented in a computer workstation for interfacing one or more application programs executing on said workstation to one or more scanners coupled with said workstation, each of said one or more scanners comprising a scanner interface, said system comprising:
    a first module operative to receive commands from said one or more application programs;
    a second module coupled with said first module and associated with a first of said one or more scanners, said second module being coupled with said scanner interface of said first of said one or more scanners and operative to receive said commands from said first module and translate said commands to said scanner interface, said second module further operative to receive image data and status data from said first of said one or more scanners via said scanner interface and provide said image data and said status data to said one or more application programs; and
    wherein said second module is capable of translating said commands to said scanner interface and receiving said image data and said status data while a scan is in progress on said first of said one or more scanners; and
    wherein said second module is capable of translating said commands to said scanner and providing said image data and said status data to said one or more application programs while a scan is in progress on said first of said one or more scanners.

9. The system of claim 8, wherein said first module is further operative to provide a uniform interface to all of said one or more applications.

10. The system of claim 8, wherein said scanner interface further comprises a hardware interface and a software interface.

11. The system of claim 8, wherein said commands comprise commands to readjust a scan in progress.

12. The system of claim 11, wherein said commands comprise commands to readjust scan quality of said scan in progress.

13. The system of claim 8, further comprising a buffer, said buffer capable of being asynchronously accessed by said one or more application programs and wherein said first module is further operative to store said image data in said buffer.

14. The system of claim 13, wherein said buffer comprises a hard disk.

15. A method of interfacing a first application program to a first scanner, said first application program executing on a first computer coupled with said first scanner, said method comprising:

(a) initiating a first scan of a first document on said first scanner as directed by said first application program;

(b) receiving first image data generated by said first scan as said first scan progresses;

(c) receiving first status data from said first scanner as said first scan progresses;

(d) providing said first image data and said first status data to said first application program as said first scan progresses; and (e) adjusting said first scan as said first scan progresses.

16. The method of claim 15, wherein (e) further comprises adjusting said first scan based on said received first image data and said received first status data.

17. The method of claim 16, wherein (e) further comprises adjusting said first scan as directed by said first application program.

18. The method of claim 17, wherein said adjusting is automatic.

19. The method of claim 15, wherein (e) further comprises adjusting an imaging algorithm of said first scanner.

20. The method of claim 15, wherein (e) further comprises adjusting the imaging resolution of said first scanner.

21. The method of claim 15, wherein (e) further comprises adjusting the bit depth of said first scanner.

22. The method of claim 15, wherein (d) further comprises providing said first image data to a buffer area accessible by said first application program.

23. The method of claim 22, wherein said storage area comprises a hard drive.

24. The method of claim 22, wherein said buffer area is asynchronously accessible by said first application program.

25. The method of claim 15, wherein said first scan progresses at a rate of approximately 65 pages per minute.

26. The method of claim 15, wherein:

(a) further comprises receiving in a first module one or more generic commands generated by said first application program to initiate said first scan, transmitting said one or more generic commands to a second module coupled with said first module, translating said one or more generic commands into one or more specific commands in said second module and transmitting said one or more specific commands from said second module to said first scanner;

(b) further comprises receiving said first image data by said second module;

(c) further comprises receiving said first status data by said second module; and (d) further comprises transmitting said first image data and said first status data to said first application program from said second module.

27. The method of claim 26, wherein said first scanner is of a first type and said second module is associated with said first type, said method further comprising providing a third module coupled with said first module and associated with a second scanner of a second type.

28. The method of claim 27, wherein said third module is coupled with said first module in place of said second module.

29. The method of claim 27, wherein said third module is coupled with said first module simultaneously with said second module.

* * * * *